(12) United States Patent
Zhang et al.

(10) Patent No.: US 11,032,728 B2
(45) Date of Patent: Jun. 8, 2021

(54) CSI-RS BASED REPORTING METHOD AND APPARATUS

(71) Applicant: HUAWEI TECHNOLOGIES CO., LTD., Guangdong (CN)

(72) Inventors: Ruiqi Zhang, Beijing (CN); Jianqin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/228,118

(22) Filed: Dec. 20, 2018

(65) Prior Publication Data

US 2019/0124537 A1    Apr. 25, 2019

Related U.S. Application Data

(63) Continuation of application No. PCT/CN2016/101138, filed on Sep. 30, 2016.

(51) Int. Cl.
*H04L 1/00* (2006.01)
*H04W 24/10* (2009.01)
(Continued)

(52) U.S. Cl.
CPC .......... *H04W 24/10* (2013.01); *H04B 7/0421* (2013.01); *H04B 7/0452* (2013.01);
(Continued)

(58) Field of Classification Search
CPC ..... H04W 24/10; H04W 72/04; H04W 74/00; H04B 7/0421; H04B 7/0452; H04B 7/0632; H04B 7/0048; H04L 25/03; H04L 5/0023
See application file for complete search history.

(56) References Cited

U.S. PATENT DOCUMENTS

| | | | |
|---|---|---|---|
| 2012/0028628 A1* | 2/2012 | Frenger | H04B 7/0417 455/422.1 |
| 2012/0087254 A1 | 4/2012 | Yin | |

(Continued)

FOREIGN PATENT DOCUMENTS

| | | |
|---|---|---|
| CN | 101873647 A | 10/2010 |
| CN | 102237957 A | 11/2011 |

(Continued)

OTHER PUBLICATIONS

3rd Generation Partnership Project; Technical Specification Group Radio Access Network;Study on Elevation Beamforming/Full—Dimension(FD) MIMO for LTE(Release 13), 3GPP Draft, 36897-101 CM, Jun. 5, 2015, 58 pages.

(Continued)

*Primary Examiner* — Abdelnabi O Musa
(74) *Attorney, Agent, or Firm* — Fish & Richardson P.C.

(57) ABSTRACT

The present disclosure describes information reporting methods and related apparatuses used to control channel state information reporting between network devices. One example method includes receiving, by a second network device, control information sent by a first network device. The control information can include a trigger signal and a channel state information type, and the trigger signal can be used to trigger the second network device to report target channel state information to the first network device. The second network device determines the target channel state information based on the channel state information type, and then reports the target channel state information to the first network device based on the trigger signal and the channel state information type.

16 Claims, 8 Drawing Sheets

(51) Int. Cl.
   *H04B 7/0417*   (2017.01)
   *H04B 7/0456*   (2017.01)
   *H04L 5/00*     (2006.01)
   *H04B 7/0452*   (2017.01)
   *H04B 7/06*     (2006.01)
   *H04L 25/03*    (2006.01)

(52) U.S. Cl.
   CPC ......... *H04B 7/0486* (2013.01); *H04B 7/0626* (2013.01); *H04B 7/0632* (2013.01); *H04B 7/0639* (2013.01); *H04B 7/0643* (2013.01); *H04B 7/0658* (2013.01); *H04L 5/0048* (2013.01); *H04L 5/0057* (2013.01); *H04L 25/03* (2013.01); *H04L 5/0023* (2013.01)

(56) References Cited

U.S. PATENT DOCUMENTS

| | | | |
|---|---|---|---|
| 2012/0106661 | A1 | 5/2012 | Jiang et al. |
| 2012/0176939 | A1 | 7/2012 | Qu et al. |
| 2015/0124726 | A1 | 5/2015 | Ni et al. |
| 2016/0156401 | A1* | 6/2016 | Onggosanusi ....... H04B 7/0478 370/329 |
| 2016/0182137 | A1 | 6/2016 | Onggosanusi et al. |
| 2016/0211899 | A1 | 7/2016 | Yang et al. |
| 2017/0257884 | A1* | 9/2017 | Rahman ............... H04B 7/0602 |
| 2018/0091992 | A1* | 3/2018 | Frenne ................. H04W 24/10 |
| 2018/0343046 | A1* | 11/2018 | Park ..................... H04W 76/27 |
| 2019/0124537 | A1 | 4/2019 | Zhang et al. |
| 2019/0312614 | A1* | 10/2019 | Kim ..................... H04B 7/0617 |

FOREIGN PATENT DOCUMENTS

| | | |
|---|---|---|
| CN | 102237969 A | 11/2011 |
| CN | 102271031 A | 12/2011 |
| CN | 102468927 A | 5/2012 |
| CN | 102684835 A | 9/2012 |
| CN | 102957467 A | 3/2013 |
| CN | 103181097 A | 6/2013 |
| CN | 103314614 A | 9/2013 |
| CN | 103391124 A | 11/2013 |
| CN | 103688474 A | 3/2014 |
| CN | 103716078 A | 4/2014 |
| CN | 104144027 A | 11/2014 |
| CN | 109076035 A | 12/2018 |
| WO | 2016089124 A1 | 6/2016 |
| WO | 2016120443 A1 | 8/2016 |

OTHER PUBLICATIONS

MCC Support:"Draft Report of 3GPP TSG RAN WG1 #86 v0 .2 .0", 3GPP Draft; vol. RAN WG1, Lisbon, Portugal; Oct. 10, 20161-Oct. 14, 2016, Sep. 12, 2016, 154 pages.
Office Action issued in Chinese Application No. 201811415017.8 dated Jun. 12, 2019, 20 pages. (With English Translation).
Office Action issued in Chinese Application No. 201811415214.X dated Jun. 17, 2019, 16 pages. (With English Translation).
Extended European Search Report issued in European Application No. 16917303.6 dated Aug. 6, 2019, 12 pages.
Office Action issued in Chinese Application No. 201680085348.2 dated Apr. 9, 2019, 7 pages.
Yu Zi feng et al.,"Channel Quantization Method in Multi-user MIMO System with Limited Feedback",Journal of Shan Ghai J Iaotong University vol. 43 No. 7 Jul. 2009,total 6 pages.
RP-160623 Samsung,"New WID Proposal: Enhancements on Full-Dimension (FD) MIMO for LTE",3GPP TSG RAN Meeting #71,Göteborg, Sweden, Mar. 7-10, 2016,total 8 pages.
3GPP TS 36.213 V14.0.0 (Sep. 2016),3rd Generation Partnership Project;Technical Specification Group Radio Access Network;Evolved Universal Terrestrial Radio Access (E-UTRA);Physical layer procedures(Release 14),dated Sep. 29, 2016,total 406 pages.
3GPP TS 36.331 V13.2.0 (Jun. 2016),3rd Generation Partnership Project;Technical Specification Group Radio Access Network;Evolved Universal Terrestrial Radio Access (E-UTRA);Radio Resource Control (RRC);Protocol specification (Release 13),total 623 pages.
International Search Report and Written Opinion issued in International Application No. PCT/CN2016/101138 dated Jun. 13, 2017, 13 pages.
Office Action issued in Japanese Application No. 2018-566306 dated Nov. 11, 2019, 6 pages (with English translation).
R1-164880-CMCC, "Considerations on hybrid non-precoded CSI-RS and beamformed CSI-RS," 3GPP TSG-RAN WG1#85, Nanjing, China, May 23-27, 2016 , 3 pages.
Xinwei, "Discussion on DMRS based Open Loop Transmission", 3GPP TSG RAN WG1 Meeting #85, R1-164898, Nanjing, China, May 23-27, 2016, 6 pages.
Qualcomm Incorporated, "Discussion on DMRS based OL and Semi-OL Transmission", 3GPP TSG-RAN WG1 #86, R1-166275, Gothenburg, Sweden, Aug. 22-26, 2016, 4 pages.
Office Action issued in Chinese Application No. 201811415017.8 dated Jul. 31, 2019, 18 pages. (With English Translation).
Office Action issued in Chinese Application No. 201811415214.x dated Aug. 8, 2019, 8 pages.

* cited by examiner

CSI-RS BASED REPORTING METHOD AND APPARATUS

CROSS-REFERENCE TO RELATED APPLICATIONS

This application is a continuation of International Application No. PCT/CN2016/101138, filed on Sep. 30, 2016, the disclosure of which is hereby incorporated by reference in its entirety.

TECHNICAL FIELD

The present invention relates to an LTE system and a 5G system, and in particular, to an information reporting method and an apparatus.

BACKGROUND

A multiple-input multiple-output (MIMO) technology is widely used in a Long Term Evolution (LTE) system. Downlink MIMO transmission may be classified into an open-loop transmission scheme and a closed-loop transmission scheme. The open-loop transmission scheme is based on a common reference signal (CRS). To be specific, the CRS is used to demodulate a downlink data channel. The closed-loop transmission scheme is classified into two schemes: a CRS-based scheme and a demodulation reference signal (DMRS)-based scheme. In the DMRS-based closed-loop transmission scheme, UE needs to feed back channel precoding matrix index (PMI) information.

In an existing LTE technology, a channel state information reference signal (CSI-RS) in a channel state information (CSI) process includes a non-precoded CSI-RS (NP CSI-RS) and a beamformed CSI-RS (BF CSI-RS). There is only one CSI-RS type in one CSI process. A terminal reports CSI based on a CSI-RS type defined by a CSI process. CSI measured and reported based on an NP CSI-RS is different from CSI measured and reported based on a BF CSI-RS.

In the existing LTE technology, there is only one CSI-RS type in one process; and when the CSI-RS type in the process is an NP CSI-RS, a corresponding CSI reporting manner is class A reporting; or when the CSI-RS type in the process is a BF CSI-RS, a corresponding CSI reporting manner is class B reporting. When the NP CSI-RS and the BF CSI-RS belong to a same process, there is no CSI reporting trigger mechanism in this mode.

SUMMARY

Embodiments of the present invention provide an information reporting method and an apparatus, to control channel state information reporting between network devices, thereby providing a new information reporting method.

A first aspect of the embodiments of the present invention provides an information reporting method, including:

sending, by a first network device, a piece of control information to a second network device, to obtain channel state information of the second network device; after the second network device receives the control information, obtaining, by the second network device from the control information, a trigger signal type and a channel state information type that are indicated by the first network device, so that the second network device reports, to the first network device based on a triggering manner indicated in the control information, target channel state information corresponding to the channel state information type.

It can be learned from the foregoing technical solution that the embodiments of the present invention have the following advantages:

The second network device receives the control information sent by the first network device, where the control information includes the trigger signal and the channel state information type, and the trigger signal is used to trigger the second network device to report the target channel state information to the first network device; the second network device determines the target channel state information based on the channel state information type; and the second network device reports the target channel state information to the first network device based on the trigger signal and the channel state information type. It can be understood that the second network device reports, based on different channel state information types, target channel state information to the first network device by using a reporting mechanism corresponding to a channel state information type. Therefore, when both an NP CSI-RS and a BF CSI-RS exist in one channel state information process, the second network device reports target channel state information to the first network device by using channel state information types respectively corresponding to the NP CSI-RS and the BE CSI-RS.

With reference to the first aspect of the embodiments of the present invention, in a first implementation of the first aspect of the embodiments of the present invention, the channel state information type includes a first type and a second type, the first type is a channel state information type corresponding to a first transmission scheme, and the second type is a channel state information type corresponding to a second transmission scheme.

In this implementation, the channel state information type becomes clearer and more specific, and is easy to understand.

With reference to the first implementation of the first aspect of the embodiments of the present invention, in a second implementation of the first aspect of the embodiments of the present invention, that the second network device, determines the target channel state information based on the channel state information type includes:

when the second network device determines that the channel state information type is the first type, determining, by the second network device, that the target channel state information is quality of a target channel, a rank of the target channel, and/or a first channel precoding matrix index that are/is corresponding to the first transmission scheme; or when the second network device determines that the channel state information type is the second type, determining, by the second network device, that the target channel state information is quality of a target channel, a rank of the target channel, and a second channel precoding matrix index that are corresponding to the second transmission scheme.

In this implementation, the first type and the second type are corresponding to different target channel state information. In this case, the second network device can more clearly know target channel state information that needs to be learned by the first network device, so that communication between the first network device and the second network device is clearer and more specific, thereby reducing incorrect data transmission.

With reference to the second implementation of the first aspect of the embodiments of the present invention, in a third implementation of the first aspect of the embodiments of the present invention, after the second network device receives the control information sent by the first network device, the method further includes:

after the second network device receives the control information sent by the first network device, reading, by the second network device from a first field in the control information, whether the channel state information type carried in the control information is the first type or the second type, where the first field in the control information carries first indication information used to indicate that the channel state information type is the first type or the second type.

In this implementation, the second network device directly reads, from the first field in the control information, that the channel state information type is the first type or the second type. This method is simple and convenient, and can reduce signaling overheads to some extent.

With reference to the first aspect of the embodiments of the present invention, in a fourth possible implementation of the first aspect of the embodiments of the present invention, the channel state information type includes a third type and a fourth type, the third type is a channel state information type corresponding to a non-precoded channel state information pilot-based measurement quantity, and the fourth type is a channel state information type corresponding to a beamformed channel state information pilot-based measurement quantity.

In this implementation, the channel state information type is classified, and it is pointed out that the channel state information type is related to a channel state information pilot, so that the channel state information type becomes clearer and more specific, and is easy to understand.

With reference to the fourth possible implementation of the first aspect of the embodiments of the present invention, in a fifth possible implementation of the first aspect of the embodiments of the present invention, that the second network device reports the target channel state information to the first network device based on the trigger signal and the channel state information type includes:

the channel state information type includes the third type and the fourth type, the two different channel state information types are respectively corresponding to two different types of target channel state information, and correspondences are as follows: The third type is corresponding to a first type of target channel state information, and the fourth type is corresponding to a second type of target channel state information.

When the second network device learns of a channel state information type, the second network device determines target channel state information based on the foregoing correspondences.

In this implementation, different channel state information types are corresponding to different target channel state information, so that the second network device directly determines the target channel state information based on the correspondences without performing an additional operation, thereby increasing a processing speed.

With reference to the fourth possible implementation of the first aspect of the embodiments of the present invention, in a sixth possible implementation of the first aspect of the embodiments of the present invention, after the second network device receives the control information sent by the first network device, the method further includes:

after the second network device receives the control information sent by the first network device, reading, by the second network device from the control information, whether the channel state information type carried in the control information is the third type or the fourth type.

The second network device may read the foregoing information from a second field in the control information.

In this implementation, the second network device directly reads, from the second field in the control information, that the channel state information type is the third type or the fourth type. This method is simple and convenient, and can reduce signaling overheads to some extent.

With reference to any one of the first aspect of the embodiments of the present invention, or the first possible implementation of the first aspect of the embodiments of the present invention to the sixth possible implementation of the first aspect of the embodiments of the present invention, in a seventh possible implementation of the first aspect of the embodiments of the present invention, the trigger signal is a single-trigger signal or a multi-trigger signal, the single-trigger signal is used to trigger the second network device to report the target channel state information to the first network device once, and the multi-trigger signal is used to trigger the second network device to report the target channel state information to the first network device at least twice.

In this implementation, a trigger instruction includes performing triggering once or performing triggering for a plurality of times. This enriches reporting methods in which the second network device is triggered to report the target channel state information.

With reference to the seventh possible implementation of the first aspect of the embodiments of the present invention, in an eighth possible implementation of the first aspect of the embodiments of the present invention, after the second network device receives the control information sent by the first network device, the method further includes:

after the second network device receives the control information sent by the first network device, reading, by the second network device from the control information, whether the trigger signal carried in the control information is the single-trigger signal or the multi-trigger signal.

The second network device may read the foregoing information from a third field in the control information.

In this implementation, the second network device directly reads, from the third field in the control information, that the trigger signal is the single-trigger signal or the multi-trigger signal. This method is simple and convenient, and can reduce signaling overheads to some extent.

With reference to any one of the fourth possible implementation of the first aspect of the embodiments of the present invention to the sixth possible implementation of the first aspect of the embodiments of the present invention, in a ninth possible implementation of the first aspect of the embodiments of the present invention, the trigger signal is a first trigger signal or a second trigger signal, the first trigger signal is used to trigger the second network device to report the first type of target channel state information to the first network device once, and the second trigger signal is used to trigger the second network device to report the second type of target channel state information to the first network device at least twice.

In this implementation, the trigger signal includes the first trigger signal and the second trigger signal, and the first trigger signal and the second trigger signal are respectively corresponding to the first type of target channel state information and the second type of target channel state information that are respectively corresponding to the third type and the fourth type, so that reporting becomes clear, thereby increasing a processing speed of reporting.

With reference to the ninth possible implementation of the first aspect of the embodiments of the present invention, in a tenth possible implementation of the first aspect of the embodiments of the present invention, after the second network device receives the control information sent by the first network device, the method further includes:

after the second network device receives the control information sent by the first network device, reading, by the second network device from the control information, whether the trigger signal carried in the control information is the first trigger signal or the second trigger signal.

The second network device may read the foregoing information from a fourth field in the control information.

In this implementation, the second network device directly reads, from the fourth field in the control information, that the trigger signal is the first trigger signal or the second trigger signal. This method is simple and convenient, and can reduce signaling overheads to some extent.

With reference to the first aspect of the embodiments of the present invention, in an eleventh possible implementation of the first aspect of the embodiments of the present invention, the control information is carried in a control channel.

A second aspect of the embodiments of the present invention provides an information reporting method, including:

sending, by a first network device, control information to a second network device, where the control information includes a trigger signal and a channel state information type, and the trigger signal is used to trigger the second network device to report target channel state information to the first network device; and receiving, by the first network device, the target channel state information sent by the second network device.

It can be learned from the foregoing technical solution that the embodiments of the present invention have the following advantages: A receiving mode in a process in which the first network device receives target control information is corresponding to a trigger signal and a channel state information type in the control information. Likewise, the target control information received by the first network device is also corresponding to the trigger signal and the channel state information type in the control information. Therefore, the embodiments of the present invention provide a new information reporting method.

With reference to the second aspect of the embodiments of the present invention, in a first possible implementation of the second aspect of the embodiments of the present invention, the channel state information type includes a first type and a second type, the first type is a channel state information type corresponding to a first transmission scheme, and the second type is a channel state information type corresponding to a second transmission scheme.

In this implementation, the channel state information type becomes clearer and more specific, and is easy to understand.

With reference to the second aspect of the embodiments of the present invention, in a second possible implementation of the second aspect of the embodiments of the present invention, the channel state information type includes a third type and a fourth type, the third type is a channel state information type corresponding to a non-precoded channel state information pilot-based measurement quantity, and the fourth type is a channel state information type corresponding to a beamformed channel state information pilot-based measurement quantity.

In this implementation, the channel state information type is classified, and it is pointed out that the channel state information type is related to a channel state information pilot measurement quantity, so that the channel state information type becomes clearer and more specific, and is easy to understand.

With reference to the second aspect of the embodiments of the present invention, in a third possible implementation of the second aspect of the embodiments of the present invention, the trigger signal is a single-trigger signal or a multi-trigger signal, the single-trigger signal is used to trigger the second network device to report the target channel state information to the first network device once, and the multi-trigger signal is used to trigger the second network device to report the target channel state information to the first network device at least twice.

In this implementation, a trigger instruction includes performing trigging once or performing trigging for a plurality of times. This enriches reporting methods in which the second network device is triggered to report the target channel state information.

With reference to the second aspect of the embodiments of the present invention, in a fourth possible implementation of the second aspect of the embodiments of the present invention, the trigger signal is a first trigger signal or a second trigger signal, the first trigger signal is used to trigger the second network device to report a first type of target channel state information to the first network device once, and the second trigger signal is used to trigger the second network device to report a second type of target channel state information to the first network device at least twice.

In this implementation, the trigger signal is the first trigger signal or the second trigger signal, the first trigger signal is corresponding to the first type of target channel state information that is corresponding to the third type, and the second trigger signal is corresponding to the second type of target channel state information that is corresponding to the fourth type, so that reporting becomes clear, thereby increasing a processing speed of reporting.

With reference to the second aspect of the embodiments of the present invention, in a fifth possible implementation of the second aspect of the embodiments of the present invention, the control information further includes a first field, a second field, a third field, or a fourth field. In this implementation, the corresponding fields in the control information are used to carry different information. This method is simple and convenient, and can reduce signaling overheads to some extent.

A third aspect of the embodiments of the present invention provides a second network device, including:

a receiving unit, configured to receive control information sent by a first network device, where the control information includes a trigger signal and a channel state information type, and the trigger signal is used to trigger the second network device to report target channel state information to the first network device;

a first determining unit, configured to determine the target channel state information based on the channel state information type; and a reporting unit, configured to report the target channel state information to the first network device based on the trigger signal and the channel state information type.

It can be learned from the foregoing technical solution that the embodiments of the present invention have the following advantages:

The reporting unit reports, based on different channel state information types, target channel state information to the first network device by using a reporting mechanism corresponding to a channel state information type. Therefore, when both an NP CSI-RS and a BF CSI-RS exist in one channel state information process, the reporting unit reports target channel state information to the first network device by using channel state information types respectively corresponding to the NP CSI-RS and the BE CSI-RS.

With reference to the third aspect of the embodiments of the present invention, in a first possible implementation of the third aspect of the embodiments of the present invention, the channel state information type includes a first type and a second type, the first type is a channel state information type corresponding to a first transmission scheme, and the second type is a channel state information type corresponding to a second transmission scheme.

In this implementation, the channel state information type becomes clearer and more specific, and is easy to understand.

With reference to the first possible implementation of the third aspect of the embodiments of the present invention, in a second possible implementation of the third aspect of the embodiments of the present invention, the first determining unit further includes:

a first determining module, configured to: when the channel state information type is the first type, determine that the target channel state information is quality of a target channel, a rank of the target channel, and/or a first channel precoding matrix index; and a second determining module, configured to: when the channel state information type is the second type, determine that the target channel state information is the quality of the target channel, the rank of the target channel, and a second channel precoding matrix index.

In this implementation, the first type and the second type are corresponding to different target channel state information. In this case, the first determining unit can more clearly know target channel state information that needs to be learned by the first network device, so that communication between the first network device and the second network device is clearer and more specific, thereby reducing incorrect data transmission.

With reference to the second possible implementation of the third aspect of the embodiments of the present invention, in a third possible implementation of the third aspect of the embodiments of the present invention, the second network device further includes:

a second determining unit, configured to determine, by using a first field in the control information, that the channel state information type is the first type or the second type, where the first field carries first indication information, and the first indication information is used to indicate that the channel state information type is the first type or the second type. In this implementation, the second determining unit reads, from the first field in the control information, that the channel state information type is the first type or the second type. This method is simple and convenient, and can reduce signaling overheads to some extent.

With reference to the third aspect of the embodiments of the present invention, in a fourth possible implementation of the third aspect of the embodiments of the present invention, the channel state information type includes a third type and a fourth type, the third type is a channel state information type corresponding to a non-precoded channel state information pilot-based measurement quantity, and the fourth type is a channel state information type corresponding to a beamformed channel state information pilot-based measurement quantity.

In this implementation, the channel state information type is classified, and it is pointed out that the channel state information type is related to a channel state information pilot measurement quantity, so that the channel state information type becomes clearer and more specific, and is easy to understand.

With reference to the fourth possible implementation of the third aspect of the embodiments of the present invention, in a fifth possible implementation of the third aspect of the embodiments of the present invention, the reporting unit further includes:

a first reporting module, configured to: when the channel state information type is the third type, report a first type of target channel state information based on the trigger signal, where the first type of target channel state information is channel state information corresponding to the non-precoded channel state information reference signal-based measurement quantity; and a second reporting module, configured to: when the channel state information type is the fourth type, report a second type of target channel state information based on the trigger signal, where the second type of target channel state information is channel state information corresponding to the beamformed channel state information reference signal-based measurement quantity.

In this implementation, different channel state information types are corresponding to different target channel state information, so that the first reporting module and the second reporting module can directly report target channel state information based on a correspondence when determining the target channel state information, without performing an additional operation, thereby increasing a processing speed.

With reference to the fourth possible implementation of the third aspect of the embodiments of the present invention, in a sixth possible implementation of the third aspect of the embodiments of the present invention, the second network device further includes:

a third determining unit, configured to determine, by using a second field in the control information, that the channel state information type is the third type or the fourth type, where the second field carries second indication information, and the second indication information is used to indicate that the channel state information type is the third type or the fourth type.

In this implementation, the third determining unit directly reads, from the second field in the control information, that the channel state information type is the third type or the fourth type. This method is simple and convenient, and can reduce signaling overheads to some extent.

With reference to any one of the third aspect of the embodiments of the present invention, or the first possible implementation of the third aspect of the embodiments of the present invention to the sixth possible implementation of the third aspect of the embodiments of the present invention, in a seventh possible implementation of the third aspect of the embodiments of the present invention, the trigger signal is a single-trigger signal or a multi-trigger signal, the single-trigger signal is used to trigger the second network device to report the target channel state information to the first network device once, and the multi-trigger signal is used to trigger the second network device to report the target channel state information to the first network device at least twice.

In this implementation, a trigger instruction includes performing trigging once or performing trigging for a plurality of times. This enriches reporting methods in which the reporting unit is triggered to report the target channel state information.

With reference to the seventh possible implementation of the third aspect of the embodiments of the present invention, in an eighth possible implementation of the third aspect of the embodiments of the present invention, the second network device further includes:

a fourth determining unit, configured to determine, by using a third field in the control information, that the trigger signal is the single-trigger signal or the multi-trigger signal, where the third field carries third indication information and fourth indication information, the third indication information is used to indicate that the trigger signal is the single-trigger signal or the multi-trigger signal, and the fourth indication information is used to indicate the channel state information type.

In this implementation, the fourth determining unit reads, from the third field in the control information, that the trigger signal is the single-trigger signal or the multi-trigger signal. This method is simple and convenient, and can reduce signaling overheads to some extent.

With reference to any one of the fourth possible implementation of the third aspect of the embodiments of the present invention to the sixth possible implementation of the third aspect of the embodiments of the present invention, in a ninth possible implementation of the third aspect of the embodiments of the present invention, the trigger signal is a first trigger signal or a second trigger signal, the first trigger signal is used to trigger the second network device to report the first type of target channel state information to the first network device once, and the second trigger signal is used to trigger the second network device to report the second type of target channel state information to the first network device at least twice.

In this implementation, the trigger signal is the first trigger signal or the second trigger signal, the first trigger signal is corresponding to the first type of target channel state information that is corresponding to the third type, and the second trigger signal is corresponding to the second type of target channel state information that is corresponding to the fourth type, so that reporting becomes clear, thereby increasing a processing speed of reporting.

With reference to the ninth possible implementation of the third aspect of the embodiments of the present invention, in a tenth possible implementation of the third aspect of the embodiments of the present invention, the second network device further includes:

a fifth determining unit, configured to determine, by using a fourth field in the control information, that the trigger signal is the first trigger signal or the second trigger signal, where the fourth field carries fifth indication information and sixth indication information, the fifth indication information is used to indicate that the trigger signal is the first trigger signal or the second trigger signal, and the sixth indication information is used to indicate that the channel state information type is the first type of target channel state information or the second type of target channel state information.

In this implementation, the fifth determining unit reads, from the fourth field in the control information, that the trigger signal is the first trigger signal or the second trigger signal. This method is simple and convenient, and can reduce signaling overheads to some extent.

With reference to the third aspect of the embodiments of the present invention, in an eleventh possible implementation of the third aspect of the embodiments of the present invention, the control information is carried in a control channel.

A fourth aspect of the embodiments of the present invention provides a first network device, including:

a sending unit, configured to send control information to a second network device, where the control information includes a trigger signal and a channel state information type, and the trigger signal is used to trigger the second network device to report target channel state information to the first network device; and a receiving unit, configured to receive the target channel state information sent by the second network device.

It can be learned from the foregoing technical solution that the embodiments of the present invention have the following advantages: A receiving mode in a process in which the receiving unit receives target control information is corresponding to a trigger signal and a channel state information type in the control information. Likewise, the target control information received by the receiving unit is also corresponding to the trigger signal and the channel state information type in the control information. Therefore, the embodiments of the present invention provide a new information reporting method.

With reference to the fourth aspect of the embodiments of the present invention, in a first possible implementation of the fourth aspect of the embodiments of the present invention, the channel state information type includes a first type and a second type, the first type is a channel state information type corresponding to a first transmission scheme, and the second type is a channel state information type corresponding to a second transmission scheme.

In this implementation, the channel state information type becomes clearer and more specific, and is easy to understand.

With reference to the fourth aspect of the embodiments of the present invention, in a second possible implementation of the fourth aspect of the embodiments of the present invention, the channel state information type includes a third type and a fourth type, the third type is a channel state information type corresponding to a non-precoded channel state information pilot-based measurement quantity, and the fourth type is a channel state information type corresponding to a beamformed channel state information pilot-based measurement quantity.

In this implementation, the channel state information type is classified, and it is pointed out that the channel state information type is related to a channel state information pilot measurement quantity, so that the channel state information type becomes clearer and more specific, and is easy to understand.

With reference to the fourth aspect of the embodiments of the present invention, in a third possible implementation of the fourth aspect of the embodiments of the present invention, the trigger signal is a single-trigger signal or a multi-trigger signal, the single-trigger signal is used to trigger the second network device to report the target channel state information to the first network device once, and the multi-trigger signal is used to trigger the second network device to report the target channel state information to the first network device at least twice.

In this implementation, a trigger instruction includes performing triggering once or performing triggering for a plurality of times. This enriches reporting methods in which the second network device is triggered to report the target channel state information.

With reference to the fourth aspect of the embodiments of the present invention, in a fourth possible implementation of the fourth aspect of the embodiments of the present invention, the trigger signal is a first trigger signal or a second trigger signal, the first trigger signal is used to trigger the second network device to report a first type of target channel state information to the first network device once, and the second trigger signal is used to trigger the second network device to report a second type of target channel state information to the first network device at least twice.

In this implementation, the trigger signal includes the first trigger signal or the second trigger signal, the first trigger signal is corresponding to the first type of target channel state information that is corresponding to the third type, and the second trigger signal is corresponding to the second type of target channel state information that is corresponding to the fourth type, so that reporting becomes clear, thereby increasing a processing speed of reporting.

With reference to the fourth aspect of the embodiments of the present invention, in a fifth possible implementation of the fourth aspect of the embodiments of the present invention, the control information further includes a first field, a second field, a third field, or a fourth field.

In this implementation, different coding fields or different fields included in the control information are used to carry different information. This method is simple and convenient, and can reduce signaling overheads to some extent.

A fifth aspect of the embodiments of the present invention provides a second network device, including:

an input device, an output device, a processor, a storage device, and a bus, where the input device, the output device, the processor, and the memory are connected by using the bus; and the processor performs the following operations:

receiving control information sent by a first network device, where the control information includes a trigger signal and a channel state information type, and the trigger signal is used to trigger the second network device to report target channel state information to the first network device;

determining the target channel state information based on the channel state information type; and reporting the target channel state information to the first network device based on the trigger signal and the channel state information type.

It can be learned from the foregoing technical solution that the embodiments of the present invention have the following advantages:

The processor receives the control information sent by the first network device, where the control information includes the trigger signal and the channel state information type, and the trigger signal is used to trigger the second network device to report the target channel state information to the first network device; the processor determines the target channel state information based on the channel state information type; and the processor reports the target channel state information to the first network device based on the trigger signal and the channel state information type. It can be understood that the processor reports, based on different channel state information types, target channel state information to the first network device by using a reporting mechanism corresponding to a channel state information type. Therefore, when both an NP CSI-RS and a BF CSI-RS exist in one channel state information process, the processor reports target channel state information to the first network device by using channel state information types respectively corresponding to the NP CSI-RS and the BE CSI-RS.

A sixth aspect of the embodiments of the present invention provides a first network device, including:

an input device, an output device, a processor, a storage device, and a bus, where the input device, the output device, the processor, and the memory are connected by using the bus; and the processor performs the following operations:

sending control information to a second network device, where the control information includes a trigger signal and a channel state information type, and the trigger signal is used to trigger the second network device to report target channel state information to the first network device; and receiving the target channel state information sent by the second network device.

It can be learned from the foregoing technical solution that the embodiments of the present invention have the following advantages:

A receiving mode in a process in which the processor receives target control information is corresponding to a trigger signal and a channel state information type in the control information. Likewise, the target control information received by the processor is also corresponding to the trigger signal and the channel state information type in the control information. Therefore, the embodiments of the present invention provide a new information reporting method.

DESCRIPTION OF EMBODIMENTS

Figure 1:
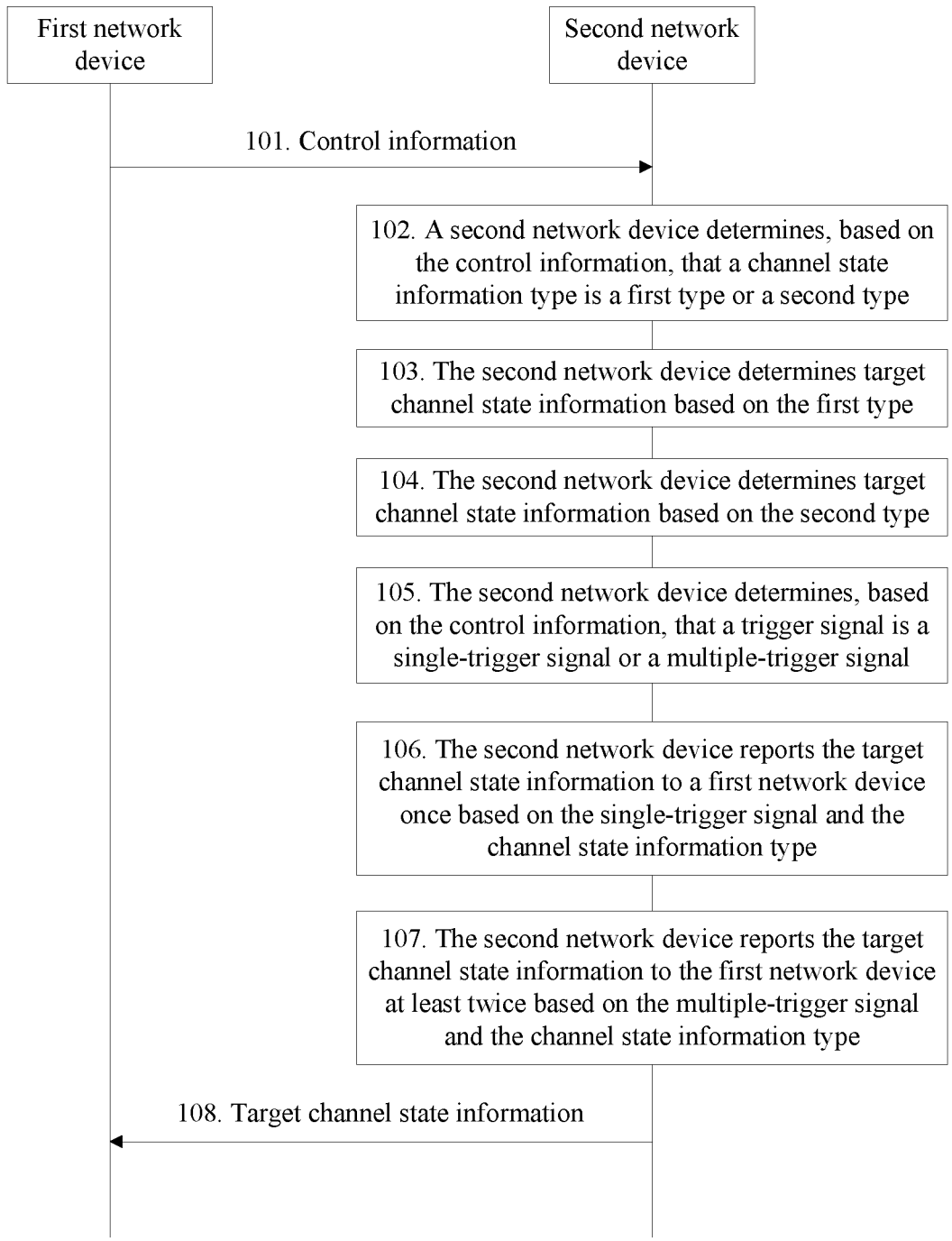
FIG. 1 is a schematic diagram of an embodiment of an information reporting method according to an embodiment of the present invention.

The embodiments of the present invention provide an information reporting method and an apparatus, to control channel state information reporting between network devices, thereby providing a new information reporting method.

To make persons skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

As an indispensable part in a modern communications system, information reporting plays a significant role in the modern communications system, and is a basic guarantee of coordinated operation between communications devices. Each communication task in a communications network needs to be performed by at least two network devices. A specific communication process of a communication task such as information reporting is usually as follows: A first communications device sends control information to a second communications device, where the control information is used to instruct the second communications device to obtain target information and report the target information to the first communications device; after receiving the control information, the second communications device obtains the corresponding target information based on the control information and sends the target information to the first communications device; and the first communications device receives the target information. Then, the communication process is completed.

For ease of understanding, in the embodiments, channel state information types are classified into two main types: channel state information types corresponding to different transmission schemes and channel state information types corresponding to different channel state information pilots. The following describes a channel state information reporting method in the embodiments of the present invention in detail based on the foregoing two different channel state information types.

In the following embodiments, descriptions are provided by using an example in which a first network device is an eNB and a second network device is a mobile terminal.

1. Channel State Information Reporting Method Corresponding to Open-Loop Transmission, Semi-Open-Loop Transmission, and Closed-Loop Transmission Referring to FIG. 1, an information reporting method in an embodiment of the present invention is described.

101. A first network device sends control information to a second network device.

In this embodiment, when the first network device needs to obtain a channel status of a channel occupied by the second network device, the first network device sends the control information to the second network device. The control information is used to instruct the second network device to send target channel state information to the first network device, and the control information is carried in a control channel PDCCH.

102. The second network device determines, based on the control information, that a channel state information type is a first type or a second type.

In this embodiment, the first type is a channel state information type corresponding to an open-loop transmission scheme or a semi-open-loop transmission scheme, the second type is a channel state information type corresponding to a closed-loop transmission scheme, the control information carries a first field indicating the channel state information type, and the second network device learns, by reading the first field in the control information, that the channel state information type is the first type or the second type.

A coding mode in which the first network device and the second network device encode the first type or the second type into the first field is as follows:

(1) A coding mode 1 of the first field in the control information is detailed in the following coding table:

| Value of the first field | Description |
| --- | --- |
| '00' | Periodically trigger channel state information reporting |
| '01' | Aperiodically trigger a serving network element C to report channel state information, the closed-loop transmission scheme |
| '10' | Aperiodically trigger a first group of serving network elements that are configured at a higher layer, to report channel state information, the open-loop/semi-open-loop transmission scheme |
| '11' | Aperiodically trigger a second group of serving network elements that are configured at a higher layer, to report channel state information, the open-loop/semi-open-loop transmission scheme |

The serving network element C in the first field is a carrier that is periodically scheduled by the first network device to the second network device for data transmission. The first group of serving network elements and the second group of serving network elements are both defined by the first network device and are network elements known by both the first network device and the second network device.

(2) A coding mode 2 of the first field in the control information is detailed in the following coding table:

| Value of the first field | Description |
| --- | --- |
| '00' | Periodically trigger channel state information reporting |
| '01' | Aperiodically trigger a serving network element C to report channel state information, the closed-loop transmission scheme |
| '10' | Aperiodically trigger the serving network element C to report channel state information, the open-loop/semi-open-loop transmission scheme |
| '11' | Aperiodically trigger a first group of serving network elements that are configured at a higher layer, to report channel state information, the closed-loop transmission scheme |

The serving network element C in the first field is a carrier that is periodically scheduled by the first network device to the second network device for data transmission. The first group of serving network elements and the second group of serving network elements are both defined by the first network device and are network elements known by both the first network device and the second network device.

(3) A coding mode 3 of the first field in the control information is detailed in the following coding table:

| Value of the first field | Description |
| --- | --- |
| '00' | Periodically trigger channel state information reporting |
| '01' | Aperiodically trigger a serving network element C to report channel state information, the closed-loop transmission scheme |
| '10' | Aperiodically trigger the serving network element C to report channel state information, the open-loop transmission scheme |
| '11' | Aperiodically trigger the serving network element C to report channel state information, the semi-open-loop transmission scheme |

The serving network element C in the first field is a carrier that is periodically scheduled by the first network device to the second network device for data transmission. The first group of serving network elements and the second group of serving network elements are both defined by the first network device and are network elements known by both the first network device and the second network device.

(4) A coding mode 4 of the first field in the control information is detailed in the following coding table:

| Value of the first field | Description |
| --- | --- |
| '000' | Periodically trigger channel state information reporting |
| '001' | Aperiodically trigger a serving network element C to report channel state information, the closed-loop transmission scheme |
| '010' | Aperiodically trigger a first group of serving network elements that are configured at a higher layer, to report channel state information, the closed-loop transmission scheme |
| '011' | Aperiodically trigger a second group of serving network elements that are configured at a higher layer, to report channel state information, the closed-loop transmission scheme |
| '100' | Reserved |
| '101' | Aperiodically trigger the serving network element C to report channel state information, the open-loop/semi-open-loop transmission scheme |
| '110' | Aperiodically trigger the first group of serving network elements that are configured at the higher layer, to report channel state information, the open-loop/semi-open-loop transmission scheme |
| '111' | Aperiodically trigger the second group of serving network elements that are configured at the higher layer, to report channel state information, the open-loop/semi-open-loop transmission scheme |

The serving network element C in the first field is a carrier that is periodically scheduled by the first network device to the second network device for data transmission. The first group of serving network elements and the second group of serving network elements are both defined by the first network device and are network elements known by both the first network device and the second network device.

In addition, in this embodiment, the coding mode of the first field in the control information may alternatively be other coding modes, and this is not limited at this time.

103. The second network device determines target channel state information based on the first type.

In this embodiment, the first type is corresponding to the open-loop transmission scheme or the semi-open-loop transmission scheme, and when the second network device determines, by reading the first field in the control information, that the channel state information is the first type, if a transmission scheme is the open-loop transmission scheme, the second network device determines that the target channel state information is quality of a target channel and a rank of the target channel; or if a transmission scheme is the semi-open-loop transmission scheme, the second network device determines that the target channel state information is quality of a target channel, a rank of the target channel, and some precoding matrix indexes of the target channel.

104. The second network device determines target channel state information based on the second type.

In this embodiment, the second type is corresponding to the closed-loop transmission scheme, and when the second network device determines, by reading the first field in the control information, that the channel state information is the second type, the second network device determines that the target channel state information is quality of a target channel, a rank of the target channel, and all precoding matrix indexes of the target channel.

105. The second network device determines, based on the control information, that a trigger signal is a single-trigger signal or a multi-trigger signal.

In this embodiment, the single-trigger signal is used to trigger the second network device to send the target channel state information to the first network device once; and likewise, when the trigger signal is the multi-trigger signal, the second network device may send the target channel state information to the first network device at least twice. There is only one trigger signal in one channel state information reporting process. Defining the trigger signal as the single-trigger signal or the multi-trigger signal is only a function definition and does not constitute a limitation on a quantity of trigger signals.

The second network device learns, by reading a third field in the control information, that the trigger signal is the single-trigger signal or the multi-trigger signal. There are the following coding modes of the third field. However, other coding modes of the third field is not limited herein.

(1) A coding mode 1 of the third field in the control information is detailed in the following coding table:

| Value of the third field | Description |
| --- | --- |
| '00' | Periodically trigger channel state information reporting |
| '01' | Aperiodically trigger a serving network element C to report channel state information once |
| '10' | Aperiodically trigger the serving network element C to report channel state information for a plurality of times |
| '11' | Aperiodically trigger a first group of serving network elements that are configured at a higher layer, to report channel state information |

The serving network element C in the third field is a carrier that is periodically scheduled by the first network device to the second network device for data transmission. The first group of serving network elements is defined by the first network device and is network elements known by both the first network device and the second network device.

(2) A coding mode 2 of the third field in the control information is detailed in the following coding table:

| Value of the third field | Description |
| --- | --- |
| '000' | Periodically trigger channel state information reporting |
| '001' | Aperiodically trigger a serving network element C to report channel state information |

| Value of the third field | Description |
| --- | --- |
| '010' | Aperiodically trigger a first group of serving network elements that are configured at a higher layer, to report channel state information |
| '011' | Aperiodically trigger a second group of serving network elements that are configured at a higher layer, to report channel state information |
| '100' | Reserved |
| '101' | Aperiodically trigger the serving network element C to report channel state information for a plurality of times |
| '110' | Aperiodically trigger the first group of serving network elements that are configured at the higher layer, to report channel state information for a plurality of times |
| '111' | Aperiodically trigger the second group of serving network elements that are configured at the higher layer, to report channel state information for a plurality of times |

The serving network element C in the third field is a carrier that is periodically scheduled by the first network device to the second network device for data transmission. The first group of serving network elements and the second group of serving network elements are both defined by the first network device and are network elements known by both the first network device and the second network device. Unless otherwise specified, trigger is the single trigger by default.

106. The second network device reports the target channel state information to the first network device once based on the single-trigger signal and the channel state information type.

In this embodiment, when the trigger signal is the single-trigger signal, if the channel state information type is the first type and the first type is corresponding to the open-loop transmission scheme, the second network device sends the quality of the target channel and the rank of the target channel to the first network device once.

When the trigger signal is the single-trigger signal, if the channel state information type is the first type and the first type is corresponding to the semi-open-loop transmission scheme, the second network device sends the quality of the target channel, the rank of the target channel, and the some precoding matrix indexes of the target channel to the first network device once.

Figure 3:
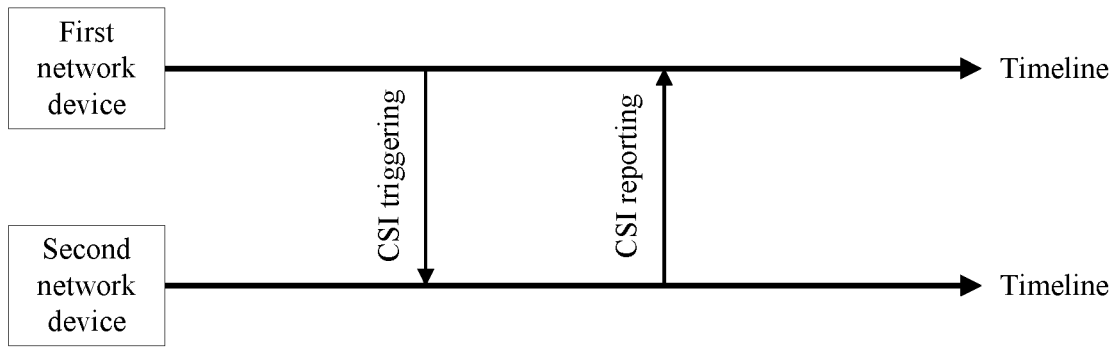
FIG. 3 is a schematic diagram of an information reporting process of an information reporting method according to an embodiment of the present invention.

When the trigger signal is the single-trigger signal, if the channel state information type is the second type and the second type is corresponding to the closed-loop transmission scheme, the second network device sends the quality of the target channel, the rank of the target channel, and all the precoding matrix indexes of the target channel to the first network device once. In addition, a simple schematic diagram of single information reporting is shown in FIG. 3.

107. The second network device reports the target channel state information to the first network device at least twice based on the multi-trigger signal and the channel state information type.

In this embodiment, when the trigger signal is the multi-trigger signal, if the channel state information type is the first type and the first type is corresponding to the open-loop transmission scheme, the second network device sends the quality of the target channel and the rank of the target channel to the first network device for a plurality of times.

When the trigger signal is the multi-trigger signal, if the channel state information type is the first type and the first type is corresponding to the semi-open-loop transmission scheme, the second network device sends the quality of the target channel, the rank of the target channel, and the some precoding matrix indexes of the target channel to the first network device for a plurality of times.

Figure 4:
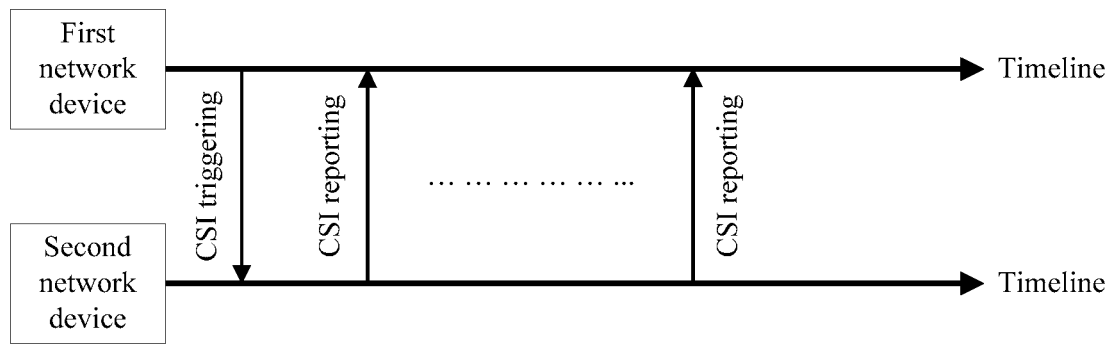
FIG. 4 is a schematic diagram of another information reporting process of an information reporting method according to an embodiment of the present invention.

When the trigger signal is the multi-trigger signal, if the channel state information type is the second type and the second type is corresponding to the closed-loop transmission scheme, the second network device sends the quality of the target channel, the rank of the target channel, and all the precoding matrix indexes of the target channel to the first network device for a plurality of times. In addition, a simple schematic diagram of reporting information for a plurality of times is shown in FIG. 4.

In addition, the single-trigger signal or the multi-trigger signal in this implementation may be further used to trigger reporting of channel state information of other channel state information types. This is not limited herein.

108. The first network device receives the target channel state information reported by the second network device.

In this embodiment, when the channel state information type is the first type and the first type is corresponding to the open-loop transmission scheme, if the trigger signal is the single-trigger signal, the first network device receives once the quality of the target channel and the rank of the target channel that are reported by the second network device; or if the trigger signal is the multi-trigger signal, the first network device receives, for a plurality of times, the quality of the target channel and the rank of the target channel that are reported by the second network device.

When the channel state information type is the first type and the first type is corresponding to the semi-open-loop transmission scheme, if the trigger signal is the single-trigger signal, the first network device receives once the quality of the target channel, the rank of the target channel, and the some precoding matrix indexes of the target channel that are reported by the second network device; or if the trigger signal is the multi-trigger signal, the first network device receives, for a plurality of times, the quality of the target channel, the rank of the target channel, and the some precoding matrix indexes of the target channel that are reported by the second network device.

When the channel state information type is the second type and the second type is corresponding to the closed-loop transmission scheme, if the trigger signal is the single-trigger signal, the first network device receives once the quality of the target channel, the rank of the target channel, and all the precoding matrix indexes of the target channel that are reported by the second network device; or if the trigger signal is the multi-trigger signal, the first network device receives, for a plurality of times, the quality of the target channel, the rank of the target channel, and all the precoding matrix indexes of the target channel that are reported by the second network device.

In addition, in this embodiment, the first network device may alternatively be a base station that triggers and controls a mobile terminal to report a channel state, or the like. This is not limited in this embodiment. Similarly, the second network device may alternatively be a terminal device with a network communication function, such as a mobile phone, a notebook computer, or a tablet computer. In this embodiment, the second network device not only can trigger information reporting corresponding to the closed-loop transmission scheme, but also can trigger information reporting corresponding to the open-loop transmission scheme and the semi-open-loop transmission scheme. In addition, while triggering reporting of channel state information of different channel state information types, the second network device can further implement functions of performing single reporting and performing reporting for a plurality of times.

Figure 2:
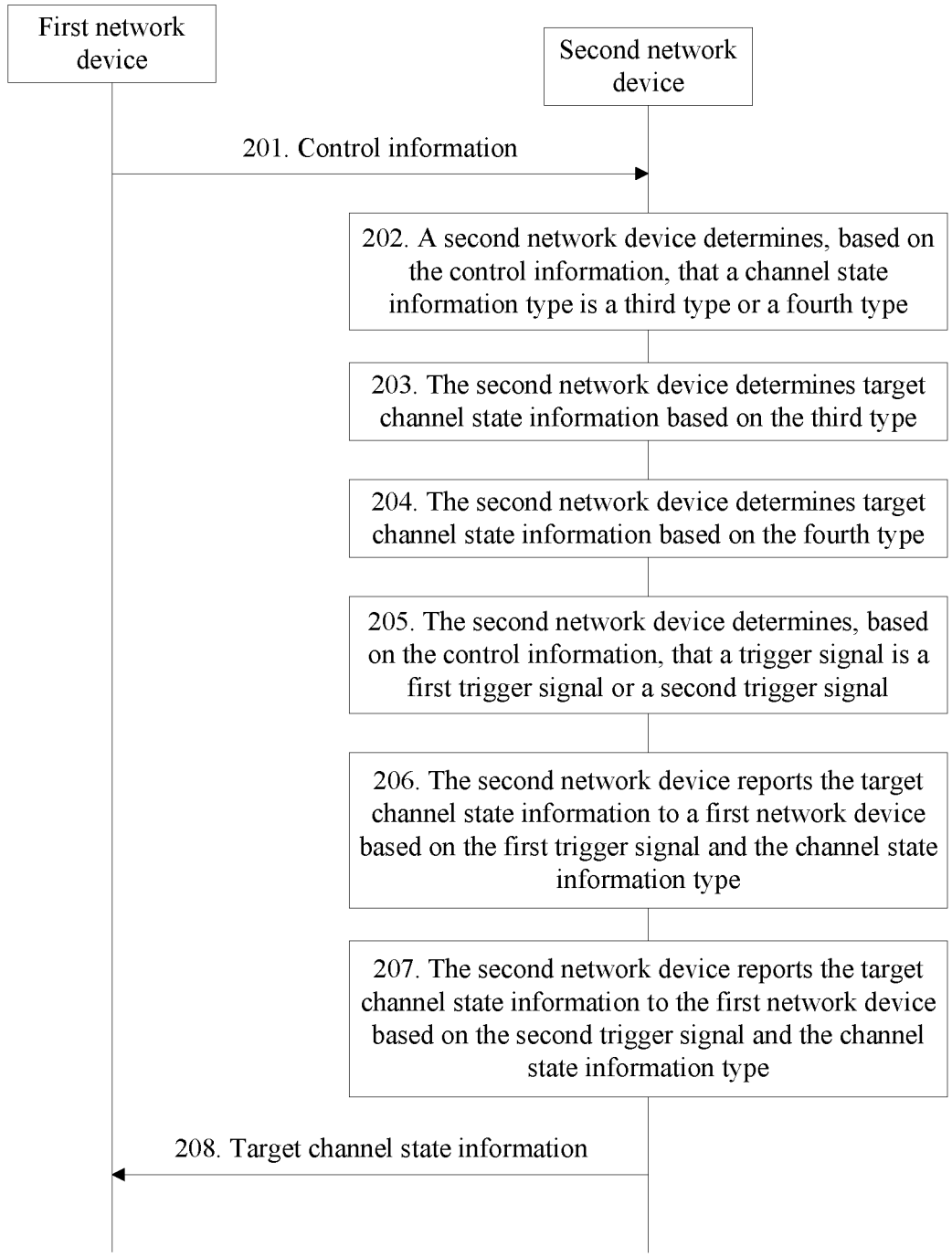
FIG. 2 is a schematic diagram of another embodiment of an information reporting method according to an embodiment of the present invention.

2. Channel State Information Reporting Method Corresponding to Non-Precoded Channel State Information Pilot-Based Measurement Quantity and Beamformed Channel State Information Pilot-Based Measurement Quantity Referring to FIG. 2, an information reporting method in an embodiment of the present invention is described.

201. A first network device sends control information to a second network device.

In this embodiment, this step is similar to the foregoing step 101, and details are not described herein again.

202. The second network device determines, based on the control information, that a channel state information type is a third type or a fourth type.

In this embodiment, for the channel state information type, the third type is corresponding to a non-precoded channel state information pilot-based measurement quantity, and the fourth type is corresponding to a beamformed channel state information pilot-based measurement quantity. NP CSI-RS is short for the non-precoded channel state information pilot measurement quantity in English, and BF CSI-RS is short for the beamformed channel state information pilot measurement quantity in English. The control information carries a second field indicating that the channel state information type is the third type or the fourth type. The second network device learns, by reading the second field in the control information, that the channel state information type is the third type or the fourth type.

There are the following coding modes for coding the second field in the control information. However, another coding mode is not limited herein.

(1) A coding mode 1 of the second field in the control information is detailed in the following coding table:

| Value of the second field | Description |
| --- | --- |
| '00' | Periodically trigger channel state information reporting |
| '01' | Aperiodically trigger a serving network element C to report channel state information |
| '10' | Aperiodically trigger the serving network element C to report a first type of target channel state information |
| '11' | Aperiodically trigger the serving network element C to report a second type of target channel state information |

The serving network element C in the second field is a carrier that is periodically scheduled by the first network device to the second network device for data transmission.

(2) A coding mode 2 of the second field in the control information is detailed in the following coding table:

| Value of the second field | Description |
| --- | --- |
| '000' | Periodically trigger channel state information reporting |
| '001' | Aperiodically trigger a serving network element C to report channel state information |
| '010' | Aperiodically trigger a first group of serving network elements that are configured at a higher layer, to report channel state information |
| '011' | Aperiodically trigger a second group of serving network elements that are configured at a higher layer, to report channel state information |
| '100' | Aperiodically trigger the serving network element C to report a first type of target channel state information |
| '101' | Aperiodically trigger the serving network element C to report a second type of target channel state information |
| '110' | Aperiodically trigger the first group of serving network elements that are configured at the higher layer, to report a first type of target channel state information |
| '111' | Aperiodically trigger the second group of serving network elements that are configured at the higher layer, to report a second type of target channel state information |

The serving network element C in the second field is a carrier that is periodically scheduled by the first network device to the second network device for data transmission. The first group of serving network elements and the second group of serving network elements are both defined by the first network device and are network elements known by both the first network device and the second network device.

203. The second network device determines target channel state information based on the third type.

In this embodiment, for the channel state information type, the third type is corresponding to the non-precoded channel state information pilot-based measurement quantity, and when delivering the non-precoded channel state information pilot measurement quantity, the first network device notifies, in the delivered control information, the second network device that the channel state information corresponding to the non-precoded channel state information pilot measurement quantity is the third type.

When the second network device learns, by reading the second field in the control information, that the channel state information type is the third type, the second network device determines that the target channel state information is a first type of target channel state information.

204. The second network device determines target channel state information based on the fourth type.

In this embodiment, for the channel state information type, the fourth type is corresponding to the beamformed channel state information pilot-based measurement quantity, and when delivering the beamformed channel state information pilot measurement quantity, the first network device notifies, in the delivered control information, the second network device that the channel state information corresponding to the beamformed channel state information pilot measurement quantity is the fourth type.

When the second network device learns, by reading the second field in the control information, that the channel state information type is the fourth type, the second network device determines that the target channel state information is a second type of target channel state information.

In addition, there are three cases of delivering a channel state information pilot measurement quantity by the first network device in one process: delivering only the non-precoded channel state information pilot measurement quantity; delivering only the beamformed channel state information pilot measurement quantity; and delivering both the non-precoded channel state information pilot measurement quantity and the beamformed channel state information pilot measurement quantity. Because the target channel state information is determined based on the channel state information type, when the first network device delivers both the non-precoded channel state information pilot measurement quantity and the beamformed channel state information pilot measurement quantity, the corresponding channel state information type includes both the third type and the fourth type. In this case, the target channel state information determined by the second network device includes both the first type of target channel state information and the second type of target channel state information in one process.

205. The second network device determines, based on the control information, that a trigger signal is a first trigger signal or a second trigger signal.

In this embodiment, the first trigger signal is used to trigger the second network device to report the first type of target channel state information to the first network device once, and the second trigger signal is used to trigger the second network device to report the second type of target channel state information to the first network device for a plurality of times.

The second network device determines, by reading the fourth field in the control information, that the trigger signal is the first trigger signal or the second trigger signal. There are the following coding modes of the fourth field in the control information. However, another coding mode of the fourth field is not limited herein.

(1) A coding mode 1 of the fourth field in the control information is detailed in the following coding table:

| Value of the fourth field | Description |
| --- | --- |
| '00' | Periodically trigger channel state information reporting |
| '01' | Aperiodically trigger a serving network element C to report the first type of target channel state information for a single time |
| '10' | Aperiodically trigger the serving network element C to report the second type of target channel state information for a plurality of times |
| '11' | Aperiodically trigger a first group of serving network elements that are configured at a higher layer, to report channel state information |

The serving network element C in the fourth field is a carrier that is periodically scheduled by the first network device to the second network device for data transmission. The first group of serving network elements is defined by the first network device and is network elements known by both the first network device and the second network device.

(2) A coding mode 2 of the fourth field in the control information is detailed in the following coding table:

| Value of the fourth field | Description |
| --- | --- |
| '000' | Periodically trigger channel state information reporting |
| '001' | Aperiodically trigger a serving network element C to report the first type of target channel state information for a single time |
| '010' | Aperiodically trigger a first group of serving network elements that are configured at a higher layer, to report the first type of target channel state information for a single time |
| '011' | Aperiodically trigger a second group of serving network elements that are configured at a higher layer, to report the first type of target channel state information for a single time |
| '100' | Reserved |
| '101' | Aperiodically trigger the serving network element C to report the second type of target channel state information for a plurality of times |
| '110' | Aperiodically trigger the first group of serving network elements that are configured at the higher layer, to report the second type of target channel state information for a plurality of times |
| '111' | Aperiodically trigger the second group of serving network elements that are configured at the higher layer, to report the second type of target channel state information for a plurality of times |

The serving network element C in the fourth field is a carrier that is periodically scheduled by the first network device to the second network device for data transmission. The first group of serving network elements and the second group of serving network elements are both defined by the first network device and are network elements known by both the first network device and the second network device.

206. The second network device reports the target channel state information to the first network device based on the first trigger signal and the channel state information type.

Figure 5:
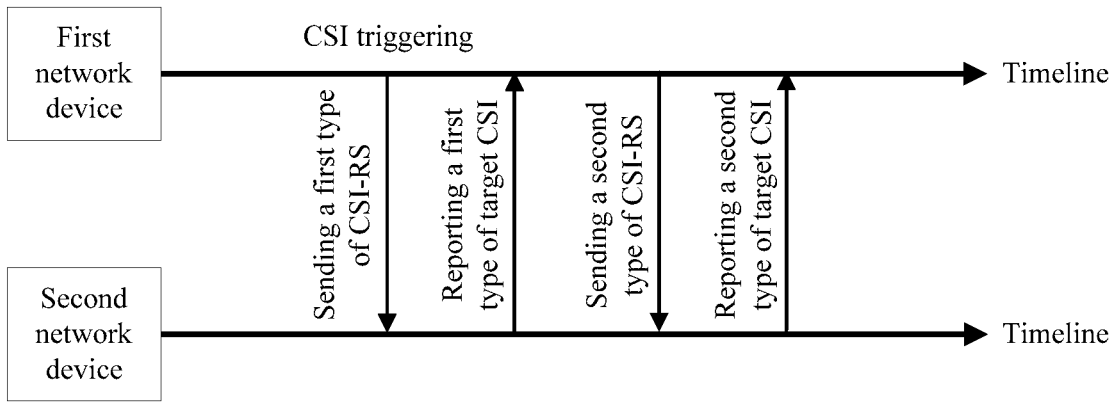
FIG. 5 is a schematic diagram of another information reporting process of an information reporting method according to an embodiment of the present invention.

In this embodiment, when the trigger signal is the first trigger signal, if the channel state information type in one channel state information process includes only the third type, the second network device reports the first type of target channel state information to the first network device once. In addition, a schematic diagram of information reporting in this embodiment is shown in FIG. 5.

207. The second network device reports the target channel state information to the first network device based on the second trigger signal and the channel state information type.

In this embodiment, when the trigger signal is the second trigger signal, if the channel state information type in one channel state information process is the fourth type, the second network device reports the second type of target channel state information to the first network device for a plurality of times.

Figure 6:
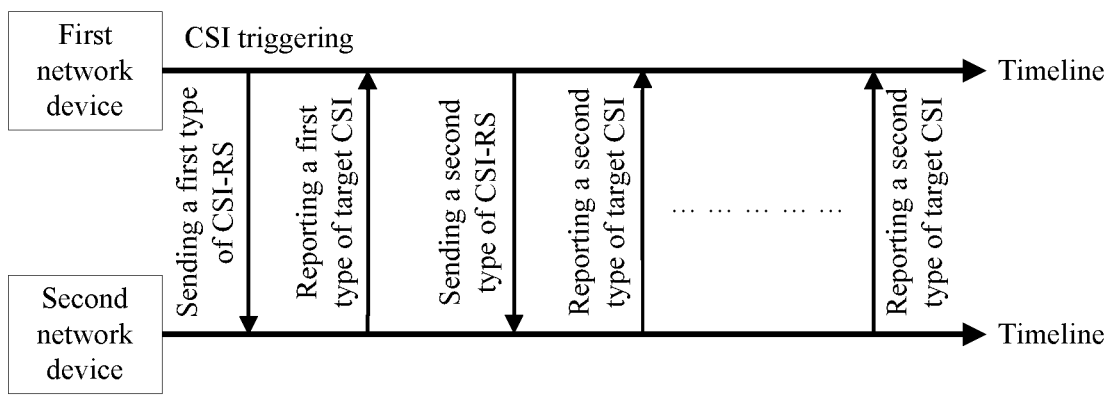
FIG. 6 is a schematic diagram of another information reporting process of an information reporting method according to an embodiment of the present invention.

In this embodiment, it can be understood that, if the channel state information type in one channel state information process includes both the third type and the fourth type, the second network device reports the first type of target channel state information to the first network device once and reports the second type of target channel state information to the first network device for a plurality of times. In addition, a schematic diagram of information reporting in this embodiment is shown in FIG. 6.

208. The first network device receives the target channel state information reported by the second network device.

In this embodiment, when the channel state information type in one channel state information process includes only the third type, the first network device receives once the first type of target channel state information sent by the second network device.

When the channel state information type includes only the fourth type in a same channel state information process, the first network device receives the second type of target channel state information sent by the second network device for a plurality of times.

When the channel state information type in one channel state information process includes both the third type and the fourth type, the first network device receives the first type of target channel state information sent by the second network device once and receives the second type of target channel state information sent by the second network device for a plurality of times.

In this embodiment, the second network device reports both the first type of target channel state information and the second type of target channel state information based on the third type and the fourth type. Therefore, when the channel state information type in one channel state information process includes both the third type and the fourth type, the second network device can also be triggered to report the target channel state information to the first network device, and a function of reporting the second type of target channel state information for a plurality of times can be further implemented.

The information reporting method according to the present invention is described in the foregoing embodiments. The following describes function-limited apparatuses corresponding to the second network device and the first network device.

1. Second Network Device

Figure 7:
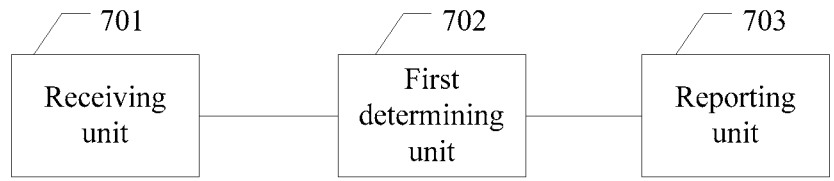
FIG. 7 is a schematic diagram of an embodiment of a second network device according to an embodiment of the present invention.

Referring to FIG. 7, a second network device in an embodiment of the present invention is described.

a receiving unit 701, configured to receive control information sent by a first network device, where the control information includes a trigger signal and a channel state information type, and the trigger signal is used to trigger the second network device to report target channel state information to the first network device;

a first determining unit 702, configured to determine the target channel state information based on the channel state information type; and a reporting unit 703, configured to report the target channel state information to the first network device based on the trigger signal and the channel state information type.

In this embodiment, the reporting unit 703 reports, based on the trigger signal and the channel state information type that are obtained based on the control information received by the receiving unit 701, the target channel state information determined by the first determining unit 702 based on the channel state information type in the control information. Therefore, the present invention provides a new information reporting method.

Figure 8:
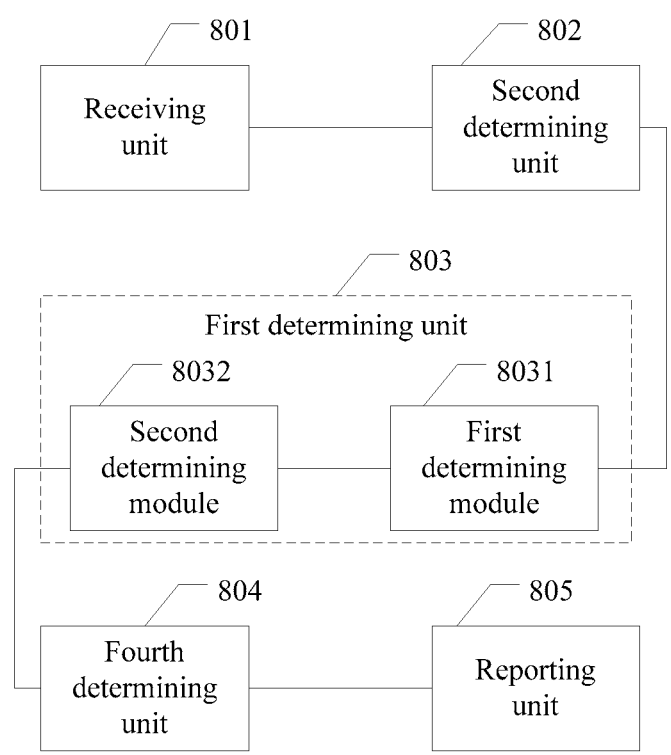
FIG. 8 is a schematic diagram of another embodiment of a second network device according to an embodiment of the present invention.

Referring to FIG. 8, a second network device in an embodiment of the present invention is described. The second network device includes:

a receiving unit 801, configured to receive control information sent by a first network device, where the control information includes a trigger signal and a channel state information type, and the trigger signal is used to trigger the second network device to report target channel state information to the first network device;

a second determining unit 802, configured to determine, by using a first field in the control information, that the channel state information type is a first type or a second type, where the first field carries first indication information, and the first indication information is used to indicate that the channel state information type is the first type or the second type;

a first determining unit 803, configured to determine the target channel state information based on the channel state information type;

a fourth determining unit 804, configured to determine, by using a third field in the control information, that the trigger signal is the single-trigger signal or the multi-trigger signal, where the third field carries third indication information and fourth indication information, the third indication information is used to indicate that the trigger signal is the single-trigger signal or the multi-trigger signal, and the fourth indication information is used to indicate the channel state information type; and a reporting unit 805, configured to report the target channel state information to the first network device based on the trigger signal and the channel state information type.

The first determining unit 803 includes:

a first determining module 8031, configured to: when the channel state information type is the first type, determine that the target channel state information is quality of a target channel, a rank of the target channel, and a first channel precoding matrix index; and a second determining module 8032, configured to: when the channel state information type is the second type, determine that the target channel state information is the quality of the target channel, the rank of the target channel, and/or a second channel precoding matrix index.

In this embodiment, the first type is corresponding to an open-loop transmission scheme and a semi-open-loop transmission scheme, and the second type is corresponding to a closed-loop transmission scheme. Therefore, the reporting unit 805 can be triggered to report both target channel state information corresponding to the closed-loop transmission scheme and target channel state information corresponding to the open-loop transmission scheme and the semi-open-loop transmission scheme, thereby providing a method for reporting the target channel state information corresponding to the open-loop transmission scheme and the semi-open-loop transmission scheme.

Figure 9:
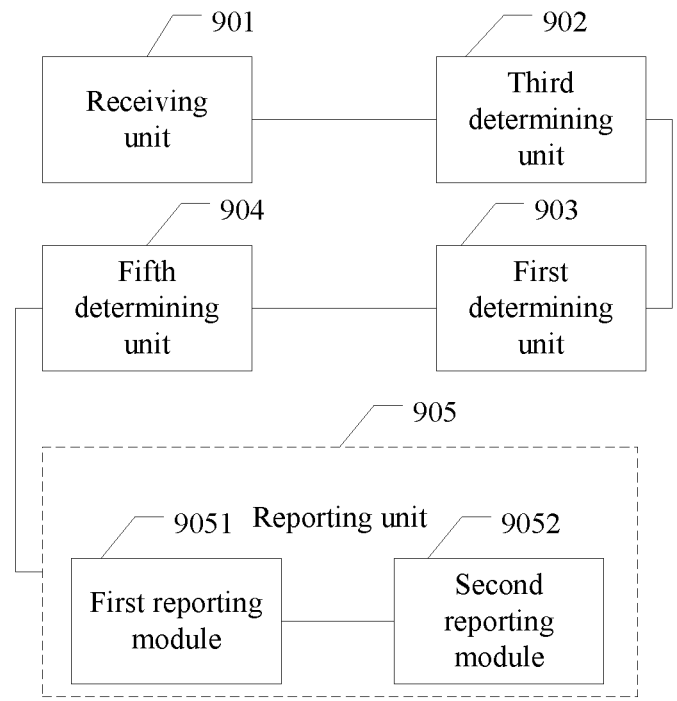
FIG. 9 is a schematic diagram of another embodiment of a second network device according to an embodiment of the present invention.

Referring to FIG. 9, a second network device in an embodiment of the present invention is described. The second network device includes:

a receiving unit 901, configured to receive control information sent by a first network device, where the control information includes a trigger signal and a channel state information type, and the trigger signal is used to trigger the second network device to report target channel state information to the first network device;

a third determining unit 902, configured to determine, by using a second field in the control information, that the channel state information type is a third type or a fourth type, where the second field carries second indication information, and the second indication information is used to indicate that the channel state information type is the third type or the fourth type;

a first determining unit 903, configured to determine the target channel state information based on the channel state information type; and a fifth determining unit 904, configured to determine, by using a fourth field in the control information, that the trigger signal is a first trigger signal or a second trigger signal, where the fourth field carries fifth indication information and sixth indication information, the fifth indication information is used to indicate that the trigger signal is the first trigger signal or the second trigger signal, and the sixth indication information is used to indicate that the channel state information type is a first type of target channel state information or a second type of target channel state information; and a reporting unit 905, configured to report the target channel state information to the first network device based on the trigger signal and the channel state information type.

The reporting unit 905 includes:

a first reporting module 9051, configured to: when the channel state information type is the third type, report the first type of target channel state information based on the trigger signal, where the first type of target channel state information is channel state information corresponding to a non-precoded channel state information reference signal-based measurement quantity; and a second reporting module 9052, configured to: when the channel state information type is the fourth type, report the second type of target channel state information based on the trigger signal, where the second type of target channel state information is channel state information corresponding to a beamformed channel state information reference signal-based measurement quantity.

In this embodiment, the third type is a channel state information type corresponding to the non-precoded channel state information pilot-based measurement quantity, and the fourth type is a channel state information type corresponding to the beamformed channel state information pilot-based measurement quantity. The first reporting module 9051 and the second reporting module 9052 in the reporting unit 905 respectively report the first type of target channel state information corresponding to the third type and the second type of target channel state information corresponding to the fourth type. Therefore, when both the third type of channel state information and the fourth type of channel state information are reported in one process, the present invention can also complete reporting of the target channel state information.

2. First Network Device

Figure 10:
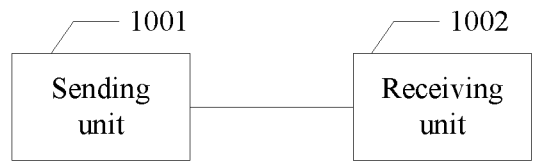
FIG. 10 is a schematic diagram of an embodiment of a first network device according to an embodiment of the present invention.

Referring to FIG. 10, a first network device in an embodiment of the present invention is described. The second network device includes:

a sending unit 1001, configured to send control information to the second network device, where the control information includes a trigger signal and a channel state information type, and the trigger signal is used to trigger the second network device to report target channel state information to the first network device; and a receiving unit 1002, configured to receive the target channel state information sent by the second network device.

In this embodiment, the control information includes a field indicating the trigger signal and the channel state information type, and the receiving unit 1002 can receive the target channel state information that is corresponding to the channel state information type and that is reported by the second network device by triggering the second network device based on the trigger signal. Therefore, this embodiment provides a new target channel state information reporting method.

The foregoing describes the functions of the first network device and the second network device. The following describes physical apparatuses respectively corresponding to the first network device and the second network device in the embodiments.

Figure 11:
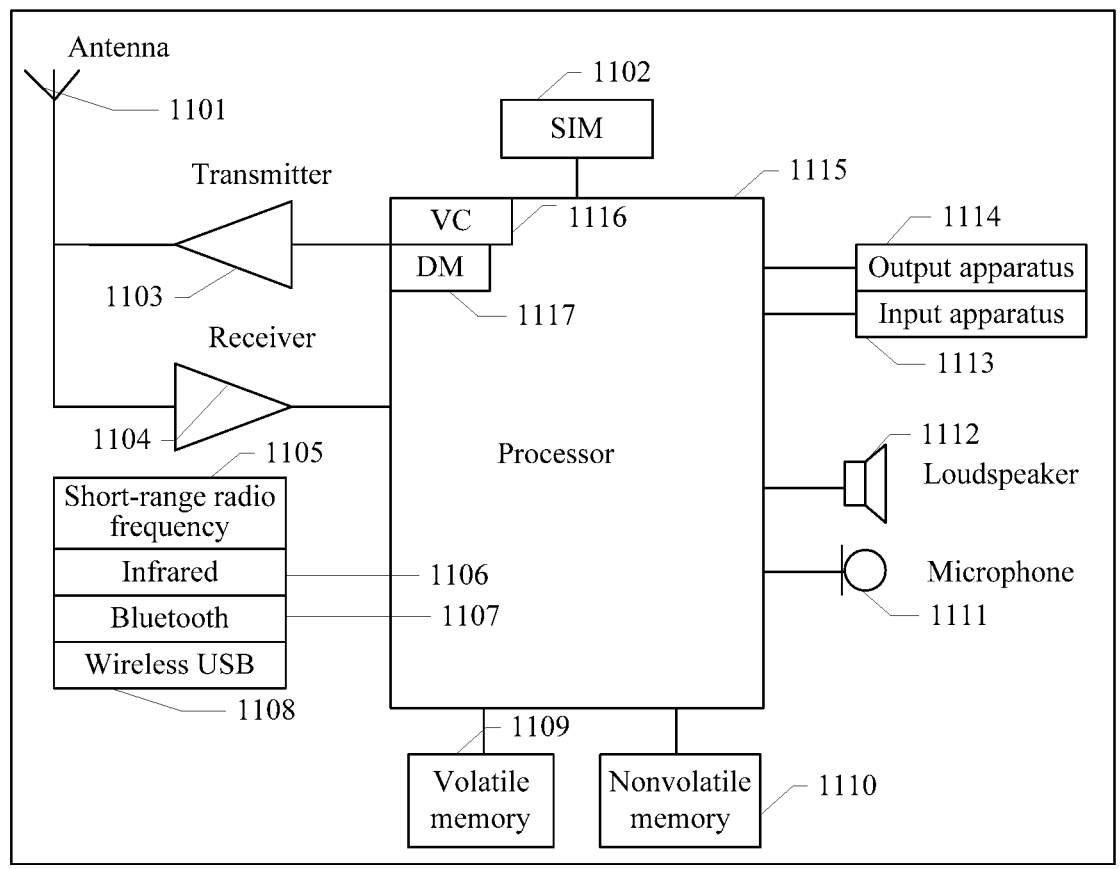
FIG. 11 is a schematic diagram of another embodiment of a second network device according to an embodiment of the present invention.

Referring to FIG. 11, a second network device in an embodiment of the present invention is described.

As shown in FIG. 11, a processor 1115 may include a circuit used for audio or a video and a logical function of a terminal device. For example, the processor 1115 may include a digital signal processor device, a microprocessor device, an analog to digital converter, a digital to analog converter, and the like. Control and signal processing functions of a mobile device may be allocated between these devices based on a respective capability of these devices. The processor 1115 may further include an internal voice coder (VC) 1116, an internal data modem (DM) 1117, and the like. In addition, the processor 1115 may include a function of operating one or more software programs, and the software programs may be stored in a memory. Usually, the processor 1115 and the stored software instruction may be configured to enable the terminal device to execute an action. For example, the processor 1115 can operate a connection program.

The terminal device may further include a user interface. The user interface may include, for example, an earphone or a loudspeaker 1112, a microphone 1111, an output apparatus 1114 (such as a display), and an input apparatus 1113 that are operatively coupled to the processor 1115. In this respect, the processor 1115 may include a user interface circuit. The user interface circuit is configured to control at least some functions of one or more elements (such as the loudspeaker 1112, the microphone 1111, and the display) in the user interface. The processor 1115 and/or the user interface circuit including the processor 1115 may be configured to control one or more functions of the one or more elements in the user interface by using a computer program instruction (such as software and/or firmware) stored in a memory accessible by the processor. Although not shown, the terminal device may include a battery configured to supply power to various circuits related to the mobile device. For example, the circuits are circuits that provide mechanical vibration as a detectable output. The input apparatus 1113 may include a device that allows the apparatus to receive data, such as a keypad, a touch display, a joystick, and/or at least one another input device.

The terminal device may further include one or more connection circuit modules that are configured to share and/or obtain data. For example, the terminal device may include a short-range radio frequency RF transceiver 1105 and/or a detector, so as to share data with an electronic device and/or obtain data from an electronic device based on an RF technology. The terminal device may include other short-range transceivers, such as an infrared IR transceiver 1106, a use transceiver, and a wireless universal serial bus (USB) transceiver 1108. A Bluetooth transceiver 1107 can perform an operation based on a low power consumption Bluetooth technology or an ultra-low power consumption Bluetooth technology. In this respect, the terminal device, which is specifically the short-range transceiver, can send and/or receive data to and/or from an electronic device near (such as within 10 meters) the apparatus. Although not shown, the terminal device can send and/or receive the data to and/or from the electronic device based on various wireless Internet technologies. These technologies include: Wi-Fi, Wi-Fi low power consumption, and a WLAN technology such as an IEEE 802.11 technology, an IEEE 802.15 technology, or an IEEE 802.16 technology.

The terminal device may include a memory that may store an information element related to a mobile user, such as a subscriber identity module SIM 1102. In addition to the SIM 1102, the apparatus may further include another removable and/or permanent memory. The terminal device may include a volatile memory 1109 and/or a nonvolatile memory 1110. For example, the volatile memory 1109 may include a random access memory (RAM) including a dynamic RAM and/or a static RAM, an on-chip and/or off-chip cache, and the like. The nonvolatile memory 1110 may be an embedded memory and/or a removable memory, and may include a read-only memory, a flash memory, a magnetic storage device such as a hard disk, a floppy drive, and a tape, an optical disk drive and/or a medium, a nonvolatile random access memory (NVRAM), and the like. Similar to the volatile memory 1109, the nonvolatile memory 1110 may include a cache area for temporarily storing data. At least a part of the volatile memory and/or nonvolatile memory may be embedded into the processor. The memory may store one or more software programs, instructions, information blocks, data, and the like that may be used by the terminal device to execute a function of the mobile terminal. For example, the memory may include an identifier that can uniquely identify the terminal device, such as an international mobile equipment identity IMEI code.

Figure 12:
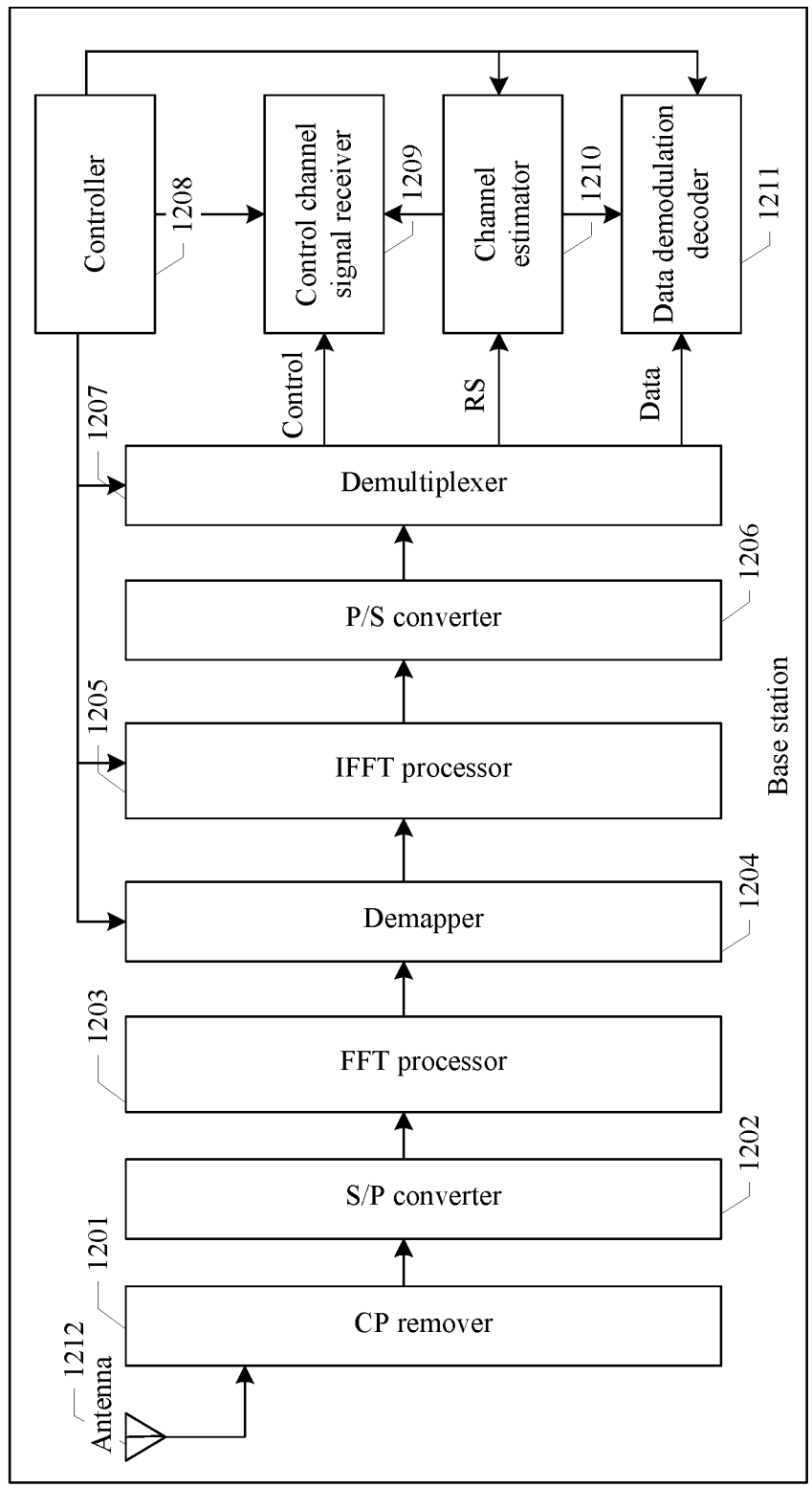
FIG. 12 is a schematic diagram of another embodiment of a first network device according to an embodiment of the present invention.

Referring to FIG. 12, a first network device in an embodiment of the present invention is described.

As shown in FIG. 12, the first network device includes an antenna 1212, a cyclic prefix (CP) remover 1201, a serial-to-parallel (S/P) converter 1202, a fast Fourier transform (FFT) processor 1203, a demapper 1204, an inverse fast Fourier transform (IFFT) processor 1205, a parallel-to-serial (P/S) converter 1206, a demultiplexer (DEMUX) 1207, a controller 1208, a control channel signal receiver 1209, a channel estimator 1210, and a data demodulation decoder 1211.

The controller 1208 provides overall control, and also generates a control signal required by the demultiplexer (DEMUX) 1207, the fast Fourier transform (FFT) processor 1203, the demapper 1204, the control channel signal receiver 1209, the channel estimator 1210, and the data demodulation decoder 1211. A control single related to UL control information and data is provided to the control channel signal receiver 1209 and the data demodulation decoder 1211. A control channel signal indicating a sequence index and a time-domain cyclic shift value is provided to the channel estimator 1210. The sequence index and the time-domain cyclic shift value are used to generate a pilot sequence allocated to UE.

The demultiplexer (DEMUX) 1207 demultiplexes, based on timing information received from the controller 1208, a signal received from the serial-to-parallel (S/P) converter 1202 into a control channel signal, a data signal, and a pilot signal. The demapper 1204 extracts those signals from a frequency resource based on the timing information and frequency allocation information that are received from the controller 1208.

When a signal including the control information is received from the UE by using the antenna 1212, the cyclic prefix (CP) remover 1201 removes a CP from the received signal. The serial-to-parallel (S/P) converter 1202 converts the signal without the CP into a parallel signal, and the fast Fourier transform (FFT) processor 1203 processes the parallel signal through FFT processing. After an FFT signal is demapped by the demapper 1204, the FFT signal is converted by the inverse fast Fourier transform (IFFT) processor 1205 into a time signal. An input/output size of the inverse fast Fourier transform (IFFT) processor 1205 changes based on the control signal received from the controller 1208. The serial-to-parallel (S/P) converter 1202 serializes the IFFT signal, and the demultiplexer (DEMUX) 1207 demultiplexes a serial signal into a control channel signal, a pilot signal, and a data signal.

The channel estimator 1210 obtains a channel estimate from the pilot signal received by the demultiplexer (DEMUX) 1207. The control channel signal receiver 1209 performs, by using the channel estimate, channel compensation on the control channel signal received from the demultiplexer (DEMUX) 1207, and obtains the control information sent by the UE. The data demodulation decoder 1211 performs, by using the channel estimate, channel compensation on the data signal received from the demultiplexer (DEMUX) 1207, and obtains, based on the control information, data sent by the UE.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An information reporting method, comprising:
receiving, by a second network device, control information sent by a first network device, wherein the control information comprises a trigger signal and a channel state information type, and wherein the trigger signal is used to trigger the second network device to report target channel state information to the first network device;
determining, by the second network device, the target channel state information based on the channel state information type from the control information; and reporting, by the second network device, the target channel state information to the first network device based on the trigger signal and the channel state information type;

wherein the channel state information type comprises a first type and a second type, the first type is the channel state information type corresponding to an open-loop transmission scheme or a semi-open-loop transmission scheme, and the second type is the channel state information type corresponding to a closed-loop transmission scheme.

2. The information reporting method according to claim 1, wherein the determining, by the second network device, the target channel state information based on the channel state information type comprises:

when the channel state information type is the first type, determining, by the second network device, that the target channel state information is at least one of a quality of a target channel, a rank of the target channel, or a first channel precoding matrix index; or when the channel state information type is the second type, determining, by the second network device, that the target channel state information is the quality of the target channel, the rank of the target channel, and a second channel precoding matrix index.

3. The information reporting method according to claim 1, wherein the channel state information type comprises a third type and a fourth type, wherein the third type is the channel state information type corresponding to a non-precoded channel state information reference signal-based measurement quantity, and wherein the fourth type is the channel state information type corresponding to a beamformed channel state information reference signal-based measurement quantity.

4. The information reporting method according to claim 3, wherein the reporting, by the second network device, the target channel state information to the first network device based on the trigger signal and the channel state information type comprises:

when the channel state information type is the third type, reporting, by the second network device, a first type of target channel state information based on the trigger signal, wherein the first type of target channel state information is channel state information corresponding to the non-precoded channel state information reference signal-based measurement quantity; or when the channel state information type is the fourth type, reporting, by the second network device, a second type of target channel state information, wherein the second type of target channel state information is channel state information corresponding to the beamformed channel state information reference signal-based measurement quantity.

5. The information reporting method according to claim 3, wherein the trigger signal is a first trigger signal or a second trigger signal, wherein the first trigger signal is used to trigger the second network device to report the first type of target channel state information to the first network device once, and wherein the second trigger signal is used to trigger the second network device to report the second type of target channel state information to the first network device at least twice.

6. The information reporting method according to claim 1, wherein the trigger signal is a single-trigger signal or a multi-trigger signal, wherein the single-trigger signal is used to trigger the second network device to report the target channel state information to the first network device once, and wherein the multi-trigger signal is used to trigger the second network device to report the target channel state information to the first network device at least twice.

7. An information reporting method, comprising:

sending, by a first network device, control information to a second network device, wherein the control information comprises a trigger signal and a channel state information type, and wherein the trigger signal is used to trigger the second network device to report target channel state information to the first network device; and receiving, by the first network device, the target channel state information sent by the second network device;

wherein the channel state information type comprises a first type and a second type, the first type is the channel state information type corresponding to an open-loop transmission scheme or a semi-open-loop transmission scheme, and the second type is the channel state information type corresponding to a closed-loop transmission scheme.

8. The information reporting method according to claim 7, wherein the channel state information type comprises a third type and a fourth type, wherein the third type is the channel state information type corresponding to a non-precoded channel state information reference signal-based measurement quantity, and wherein the fourth type is the channel state information type corresponding to a beamformed channel state information reference signal-based measurement quantity.

9. The information reporting method according to claim 7, wherein the trigger signal is a single-trigger signal or a multi-trigger signal, wherein the single-trigger signal is used to trigger the second network device to report the target channel state information to the first network device once, and wherein the multi-trigger signal is used to trigger the second network device to report the target channel state information to the first network device at least twice.

10. The information reporting method according to claim 7, wherein the trigger signal is a first trigger signal or a second trigger signal, wherein the first trigger signal is used to trigger the second network device to report a first type of target channel state information to the first network device once, and wherein the second trigger signal is used to trigger the second network device to report a second type of target channel state information to the first network device at least twice.

11. A second network device, comprising:

at least one processor;

a memory coupled to the at least one processor and storing programming instructions for execution by the at least one processor, where the programming instructions instruct the at least one processor to:

receive control information sent by a first network device, wherein the control information comprises a trigger signal and a channel state information type, and the trigger signal is used to trigger the second network device to report target channel state information to the first network device;

determine the target channel state information based on the channel state information type from the control information; and report the target channel state information to the first network device based on the trigger signal and the channel state information type;

wherein the channel state information type comprises a first type and a second type, the first type is the channel state information type corresponding to an open-loop transmission scheme or a semi-open-loop transmission scheme, and the second type is the channel state information type corresponding to a closed-loop transmission scheme.

12. The second network device according to claim 11, wherein the programming instructions instruct the at least one processor to:
when the channel state information type is the first type, determine that the target channel state information is at least one of a quality of a target channel, a rank of the target channel, or a first channel precoding matrix index; and
when the channel state information type is the second type, determine that the target channel state information is at least one of the quality of the target channel, the rank of the target channel, and a second channel precoding matrix index.

13. The second network device according to claim 11, wherein the channel state information type comprises a third type and a fourth type, wherein the third type is the channel state information type corresponding to a non-precoded channel state information reference signal-based measurement quantity, and the fourth type is the channel state information type corresponding to a beamformed channel state information reference signal-based measurement quantity.

14. The second network device according to claim 13, wherein the programming instructions instruct the at least one processor to:
when the channel state information type is the third type, report a first type of target channel state information based on the trigger signal, wherein the first type of target channel state information is channel state information corresponding to the non-precoded channel state information reference signal-based measurement quantity; and
when the channel state information type is the fourth type, report a second type of target channel state information based on the trigger signal, wherein the second type of target channel state information is channel state information corresponding to the beamformed channel state information reference signal-based measurement quantity.

15. The second network device according to claim 13, wherein the trigger signal comprises a first trigger signal or a second trigger signal, wherein the first trigger signal is used to trigger the second network device to report the first type of target channel state information to the first network device once, and wherein the second trigger signal is used to trigger the second network device to report the second type of target channel state information to the first network device at least twice.

16. The second network device according to claim 11, wherein the trigger signal is a single-trigger signal or a multi-trigger signal, the single-trigger signal is used to trigger the second network device to report the target channel state information to the first network device once, and the multi-trigger signal is used to trigger the second network device to report the target channel state information to the first network device at least twice.

* * * * *